United States Patent
Beever

(10) Patent No.: US 9,682,702 B2
(45) Date of Patent: Jun. 20, 2017

(54) VEHICLE CONTROL INCLUDING CONTROL OVER A RATE OF TORQUE DECREASE

(71) Applicant: Jaguar Land Rover Limited, Whitley, Coventry, Warwickshire (GB)

(72) Inventor: Paul Beever, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/898,408

(22) PCT Filed: May 22, 2014

(86) PCT No.: PCT/EP2014/060555
§ 371 (c)(1),
(2) Date: Dec. 14, 2015

(87) PCT Pub. No.: WO2014/198512
PCT Pub. Date: Dec. 18, 2014

(65) Prior Publication Data
US 2016/0137196 A1 May 19, 2016

(30) Foreign Application Priority Data
Jun. 14, 2013 (GB) .................................. 1310638.0

(51) Int. Cl.
*B60W 30/045* (2012.01)
*B60W 30/02* (2012.01)
(Continued)

(52) U.S. Cl.
CPC .......... *B60W 30/045* (2013.01); *B60W 30/02* (2013.01); *B60W 30/18145* (2013.01);
(Continued)

(58) Field of Classification Search
CPC .............. B60W 30/045; B60W 30/02; B60W 50/0097; B60W 2520/125
(Continued)

(56) References Cited

U.S. PATENT DOCUMENTS 7,409,278 B2 * 8/2008 Banno .................... B60T 8/175
340/440
8,751,131 B2 6/2014 Reynolds et al.
(Continued)

FOREIGN PATENT DOCUMENTS

| EP | 2460703 A1 | 6/2012 |
| JP | 2006137392 A | 6/2006 |
| WO | H0137778 A | 2/1998 |

OTHER PUBLICATIONS

"Oversteer", https://web.archive.org/web/20120414135759/http://www.drivingfast.net/car-control/oversteer.htm, dated Apr. 14, 2012, 8 pages.
(Continued)

*Primary Examiner* — Yazan Soofi
(74) *Attorney, Agent, or Firm* — Reising Ethington P.C.

(57) ABSTRACT

A method of controlling a vehicle includes determining whether control over a rate of torque decrease is desired in order to improve the vehicle behavior. The rate of torque decrease is controlled to stay within a range of a selected rate of change. A vehicle control system includes a controller configured to determine whether control over a rate of torque decrease is desired. The controller is also configured to control the rate of torque decrease to stay within a range of a selected rate of change.

16 Claims, 2 Drawing Sheets

(51) Int. Cl.
*B60W 30/18* (2012.01)
*B60W 50/00* (2006.01)

(52) U.S. Cl.
CPC ... *B60W 50/0097* (2013.01); *B60W 2520/125* (2013.01); *B60W 2520/26* (2013.01); *B60W 2540/18* (2013.01); *B60W 2710/0672* (2013.01); *B60W 2720/26* (2013.01); *Y02T 10/84* (2013.01)

(58) Field of Classification Search
USPC .......................................................... 701/90
See application file for complete search history.

(56) References Cited

U.S. PATENT DOCUMENTS

| | | | |
|---|---|---|---|
| 2004/0138024 | A1 | 7/2004 | Kano et al. |
| 2007/0027605 | A1 | 2/2007 | Fodor et al. |
| 2009/0076699 | A1* | 3/2009 | Osaki .................. B60T 7/22 701/78 |
| 2016/0137196 | A1* | 5/2016 | Beever .............. B60W 50/0097 701/90 |

OTHER PUBLICATIONS

Combined Search and Examination Report corresponding to application No. GB1310638.0, dated Dec. 5, 2013, 8 pages.
International Search Report corresponding to International application No. PCT/EP/2014/060555, dated Jul. 8, 2014, 5 pages.
Written Opinion corresponding to International application No. PCT/EP/2014/060555, dated Jul. 8, 2014, 6 pages.

* cited by examiner

VEHICLE CONTROL INCLUDING CONTROL OVER A RATE OF TORQUE DECREASE

TECHNICAL FIELD

The subject matter of this description generally relates to vehicle control. More particularly, but not exclusively, the subject matter of this description relates to adaptively controlling a rate at which torque associated with a vehicle powertrain decreases. Aspects of the subject matter of this description relate to a method, a system and a vehicle.

BACKGROUND

Traction control systems, also known as anti-slip regulation (ASR) systems, are used on vehicles to prevent loss of traction of the driven wheels to maintain control of the vehicle and to prevent deterioration of the accelerating performance due to longitudinal slip of the driven wheels. Traction control is necessary, for example, when the driver applies the accelerator excessively and the condition of the road surface is such that the torque applied to the wheels causes them to slip.

Feedback control methods, which are typically employed, include monitoring wheel slip and detecting when it becomes excessive due to an excessive driving torque (e.g. sudden application of the accelerator pedal). After such a determination appropriate action may be taken, such as reducing the engine output or applying a braking force to the driven wheels. Traction control may be implemented within the engine control unit (ECU) of the vehicle to reduce engine torque by retarding or suppressing the spark to one or more cylinders of the engine, reducing fuel supply to one or more of the engine cylinders, closing the throttle, or, in turbocharged vehicles, actuating the boost control solenoid to reduce boost and therefore engine power. Additionally, the wheel brake to one or more of the wheels may be applied to control wheel slip and transfer drive torque from a slipping wheel to at least one other which may be able to generate even greater traction forces.

Traction control systems are typically implemented in a vehicle as part of a stability control system (SCS) operable to enhance stability of a vehicle by detecting and reducing excessive wheel slip. If excessive wheel slip or vehicle instability associated with excessive wheel slip is detected while cornering, the stability control system may automatically apply braking to individual wheels or alter the powertrain torque output to assist a driver in steering the vehicle in an intended direction, for example around a corner.

The feedback approach used in existing SCS may not provide a fast enough response under certain driving conditions. For example the time required for the wheel slip measurements (or values) to be calculated and processed within the ECU and for an effective response to be implemented may be longer than the time it takes for undesirable effects resulting from wheel slip to occur, resulting in a missed opportunity to provide automated stability enhancements in a timely manner.

It is against this background that the present invention has been conceived. Embodiments of the invention may provide a method, a system or a vehicle that provide control over a rate that torque associated with a vehicle powertrain decreases to improve vehicle behavior. The rate control may be based on a request from the driver to decrease torque. The torque decrease rate may be kept within a range of a rate limit, which is dynamically variable depending on the current conditions, such as the driving maneuver the vehicle is performing.

SUMMARY

According to an embodiment, a method of controlling a vehicle includes determining whether control over a rate of torque decrease is desired. The rate of torque decrease is controlled to stay within a range of a selected rate of change.

In an embodiment, the determining comprises determining that the vehicle turning.

In an embodiment, the determining comprises determining whether a friction value that is associated with a surface that vehicle wheels contact as the vehicle is moving is below a threshold.

In an embodiment, the threshold indicates wheel slip.

In an embodiment, the threshold corresponds to a limit of cornering adhesion.

In an embodiment, the determining comprises at least one of detecting or predicting a downshift in a transmission of the vehicle.

In an embodiment, the determining comprises at least one of detecting or predicting lift-off oversteer.

An embodiment the method includes controlling the rate of torque decrease based on at least one of a current surface friction, a current vehicle lateral acceleration, or a current vehicle speed.

In an embodiment, the selected rate of change avoids lift-off oversteer.

According to an embodiment, a system includes a controller configured to determine whether control over a rate of torque decrease is desired. The controller is also configured to control the rate of torque decrease to stay within a range of a selected rate of change.

In an embodiment, the controller is configured to determine whether the vehicle turning.

In an embodiment, the controller is configured to determine whether a friction value that is associated with a surface that vehicle wheels contact as the vehicle is moving is below a threshold.

In an embodiment, the threshold indicates wheel slip.

In an embodiment having one or more features of the system of any of the preceding paragraphs, the threshold corresponds to a limit of cornering adhesion.

In an embodiment, the powertrain comprises a transmission, and the controller is configured to detect or predict a downshift in the transmission.

In an embodiment, the controller is configured to detect or predict lift-off oversteer.

An embodiment, the controller is configured to control the rate of torque decrease based on at least one of a current surface friction, a current vehicle lateral acceleration, or a current vehicle speed.

In an embodiment, the selected rate of change avoids lift-off oversteer.

According to an embodiment, a vehicle includes the system of any of the preceding paragraphs.

An embodiment includes a plurality of wheels that are driven by the powertrain. The selected rate of change corresponds to at least one of the wheels having a desired frictional engagement with a surface over which the vehicle is moving.

Within the scope of this application it is expressly envisaged that the various aspects, embodiments, examples and alternatives set out in the preceding paragraphs, in the claims, or the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, which can be briefly described as follows.

DETAILED DESCRIPTION

Figure 1:
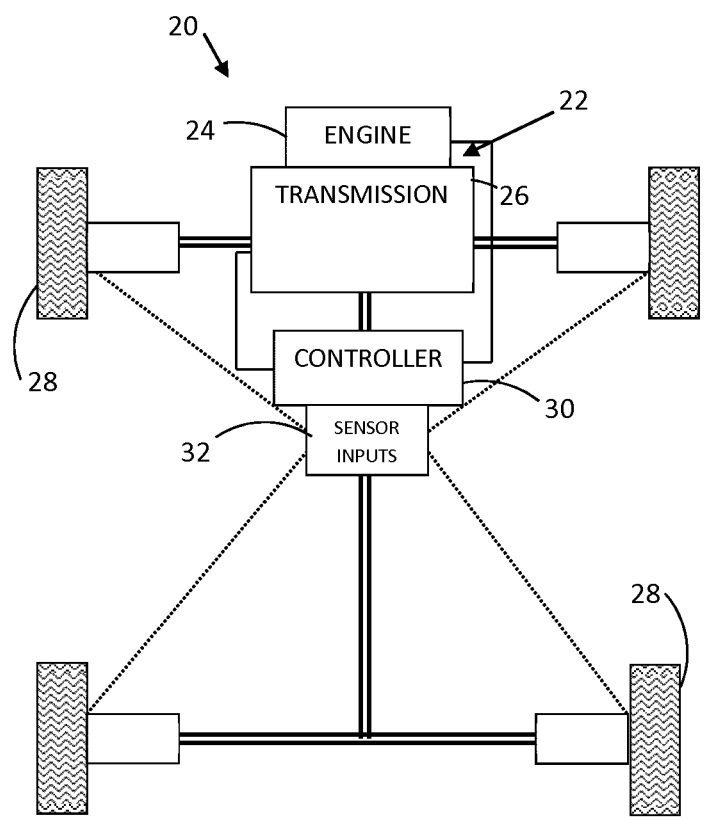
FIG. 1 diagrammatically illustrates selected portions of a vehicle designed according to an embodiment of this invention that includes a system for controlling a rate of change of torque associated with the vehicle powertrain.

FIG. 1 schematically illustrates selected portions of a vehicle 20. A powertrain 22 of the vehicle includes an engine 24 and a transmission 26 for delivering torque to vehicle wheels 28. In some examples, two of the wheels 28 will be driven by torque applied by the powertrain 22. In other examples, all four of the wheels 28 receive driving torque from the powertrain 22. Brakes (not illustrated) are included for applying a braking force to resist rotation of the wheels 28.

The vehicle 20 includes a controller 30 that is configured to adaptively control operation of the powertrain 22 for controlling vehicle movement or performance. A plurality of conventional sensors (not illustrated) provide information to the controller 30 in a known manner regarding various aspects of vehicle or vehicle component movement or performance. The information provided to the controller 30 is schematically represented by the sensor inputs 32. The controller 30 uses known techniques and the sensor inputs 32 to determine various aspects of vehicle movement or performance, such as direction, speed, acceleration, lateral acceleration or slip. The controller 30 is configured to control changes in torque associated with the powertrain 22 based on a request or indication from the driver, information from the sensor inputs 32, other information regarding a status or operation of the vehicle, or an indication of an upcoming change in vehicle or component status. The manner in which the controller 30 controls changes in torque includes controlling a rate of torque change to provide control over vehicle movement or performance.

Figure 2:
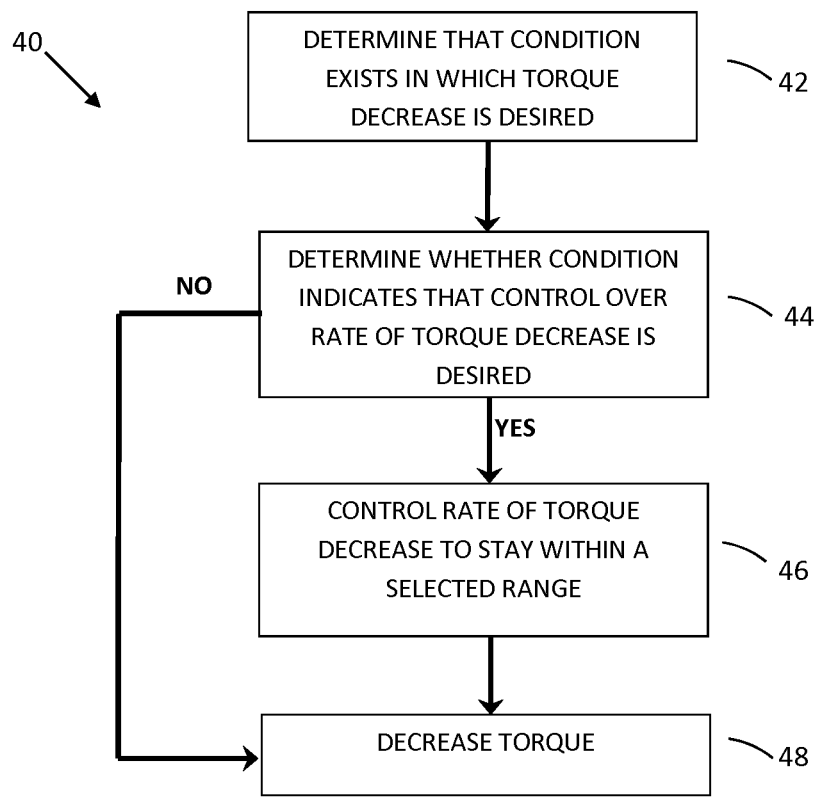
FIG. 2 is a flowchart diagram summarizing an example control strategy.

FIG. 2 includes a flow chart diagram 40 that summarizes an example approach used by the controller 30 for controlling the torque associated with the powertrain 22. At 42, the controller 30 determines whether a condition exists in which it is desirable or necessary to decrease the torque from the powertrain 22 to one or more of the wheels 28. Determining whether a torque decrease is desired in many or most circumstances will be based, at least in part, on driver input, such as a change in the accelerator input. In other words, there are various conditions in which a driver provides an indication that corresponds to a desire or need to decrease torque. Determining whether a torque decrease is desired also may be based on an autonomous determination made by the controller 30 (possibly in combination with driver input or independent of driver input).

The condition that includes a desire for a decrease in torque may be a currently existing condition or one that will very soon exist. In other words, the example controller 30 is configured to address an existing condition or to anticipate a potential condition and control a rate of torque change accordingly. The controller 30 in some embodiments is configured to do at least one of detect or predict a condition or situation in which torque decrease is desired. Example conditions that may include a desire to decrease the torque include when the vehicle is turning, a cornering maneuver, or lateral acceleration that is higher than a preset limit (e.g., slipping sideways). Another example condition in which a decrease in torque may be desired includes a downshift in the transmission 26. Another potential reason for limiting torque decrease rates may arise under a condition when the effective torque is in the negative (drag) region or the wheel loads vary due to geometry effects. This may occur, for example, if the vehicle is cresting a slope such that the contact between the driven wheels and the surface is reduced (or even eliminated temporarily). There may be other conditions that may introduce a need or desire to reduce torque from the powertrain 22.

At 44, the controller 30 determines whether there is a need to control a rate at which torque decreases. For example, if the vehicle is turning it may be useful or necessary to control how quickly torque decreases to avoid or minimize lift-off oversteer. Other conditions may exist or be impending in which too rapid of a decrease in torque will introduce or contribute to vehicle instability or a lack of desired performance.

Various sensor inputs 32 may be useful for determining whether controlling the rate of torque decrease is desired (i.e., needed or would be beneficial). For example, a need to control the rate of torque decrease may be indicated by sensor inputs to the controller 30 indicating that lateral acceleration is near or beyond a preselected threshold, a surface friction value is below a preselected threshold or wheel slip is occurring. The controller in some embodiments may determine whether a friction value is below or approaching a threshold, such as a minimum friction value that indicates sufficient cornering adhesion. There are known ways of making such determinations and the controller 30 in one example is programmed to apply known principles or analysis techniques for determining when the rate of torque decrease should be controlled. Given this description and such known techniques, those skilled in the art will be able to determine the conditions under which their particular controller will control the rate at which torque decreases.

If the rate of torque decrease should be controlled, the controller 30 limits the rate of torque decrease at 46. The selected limit on the rate of change may correspond, for example, to at least one of the wheels having a desired frictional engagement with a surface over which the vehicle is moving. In one embodiment, the controller 30 controls the rate of torque decrease based on at least one of a current surface friction, a current vehicle lateral acceleration, or a current vehicle speed.

In some embodiments, the controller 30 maintains the rate of decrease within a preselected or predetermined range of a rate limit that is appropriate for the condition. Some embodiments include a plurality of ranges to address different conditions and the controller 30 selects an appropriate range for a given situation.

With the appropriate rate limit in place, the controller decreases the torque at 48 while keeping the rate of decrease below a selected rate or at least within an appropriate range of the selected rate. In some embodiments the torque decrease rate limit is dynamically variable depending on the current conditions, such as the driving maneuver the vehicle is performing. The controller 30 in some examples is preprogrammed to recognize or determine different rate limits for different conditions and to utilize different acceptable ranges surrounding the selected rate limit depending on the circumstances. Other examples include at least one selected default rate limit and a default range surrounding that limit, which can always be used by the controller. A default rate limit and a default range may be useful for systems that do not include or require dynamic variability in the rate control or for circumstances in which the information available to the controller is insufficient for the controller to accurately identify the condition being addressed.

The controller 30 controls at least one aspect of the powertrain 22 to realize the desired control over the torque rate decrease. For example, the controller 30 may automatically implement an adjustment to the operation of the engine 24, the transmission 26, or both.

In the example of FIG. 2 it is possible that a condition occurs in which a decrease in torque is desired or necessary and there is no need to limit the rate of decrease. Under such circumstances, the determination at 44 includes a negative result and the controller proceeds to decrease the torque at 48 without implementing any limit over the rate of torque decrease.

One feature of some example embodiments is that they provide a feed forward approach to controlling torque for enhancing or maintaining desired vehicle stability or performance. A feed forward approach allows for making the determinations necessary to address an existing or potential condition in a more timely fashion that would have been available with a feedback-based approach. Still, some embodiments include one or more feedback approaches for controlling a torque decrease rate.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims.

The invention claimed is:

1. A method of controlling a vehicle, comprising:
   determining whether control over a rate of torque decrease is desired by predicting lift-off oversteer,
   wherein predicting lift-off oversteer comprises determining whether the vehicle is turning and determining whether a friction value that is associated with a surface that vehicle wheels contact as the vehicle is moving is below a threshold; and
   in response to determining that a rate of powertrain torque decrease is required, decreasing torque applied to the powertrain and controlling the rate of torque decrease to stay within a range of a selected rate of change.

2. The method of claim 1, wherein the threshold indicates wheel slip.

3. The method of claim 1, wherein the threshold corresponds to a limit of cornering adhesion.

4. The method of claim 1, wherein the determining comprises at least one of detecting or predicting a downshift in a transmission of the vehicle.

5. The method of claim 1, comprising controlling the rate of torque decrease based on at least one of
   a current surface friction;
   a current vehicle lateral acceleration; or
   a current vehicle speed.

6. The method of claim 1, wherein the selected rate of change addresses lift-off oversteer by at least one of avoiding lift-off oversteer, minimizing lift-off oversteer or reducing lift-off oversteer.

7. The method of claim 1, comprising
   determining a plurality of different rate limits for different conditions, respectively; and utilizing different ranges surrounding the selected rate limit based on the condition.

8. A vehicle control system, comprising:
   a powertrain; and
   a controller configured to:
      determine whether control over a rate of torque decrease is desired by predicting lift-off oversteer, wherein predicting lift-off oversteer comprises determining whether the vehicle is turning and determining whether a friction value that is associated with a surface that vehicle wheels contact as the vehicle is moving is below a threshold; and
      in response to determining that a rate of powertrain torque decrease is required, decrease torque applied to the powertrain and control the rate of torque decrease to stay within a range of a selected rate of change.

9. The system of claim 8, wherein the threshold indicates wheel slip.

10. The system of claim 8, wherein the threshold corresponds to a limit of cornering adhesion.

11. The system of claim 8, wherein
    the powertrain comprises a transmission; and
    the controller is configured to detect or predict a downshift in the transmission.

12. The system of claim 8, wherein the controller is configured to control the rate of torque decrease based on at least one of:
    a current surface friction;
    a current vehicle lateral acceleration; or
    a current vehicle speed.

13. The system of claim 8, wherein the selected rate of change addresses lift-off oversteer by at least one of avoiding lift-off oversteer, minimizing lift-off oversteer or reducing lift-off oversteer.

14. The system of claim 8, wherein the controller is configured to determine a plurality of different rate limits for different conditions, respectively; and
    utilize different ranges surrounding the selected rate limit based on the condition.

15. A vehicle, comprising:
    a vehicle control system, including:
       a powertrain; and
       a controller configured to determine whether control over a rate of torque decrease is desired by predicting lift-off oversteer,
       wherein predicting lift-off oversteer comprises determining whether the vehicle is turning and determining whether a friction value that is associated with a surface that vehicle wheels contact as the vehicle is moving is below a threshold; and
       in response to determining that a rate of powertrain torque decrease is required, decreasing torque applied to the powertrain and controlling the rate of torque decrease to stay within a range of a selected rate of change.

16. The vehicle of claim 15, comprising a plurality of wheels that are driven by the powertrain and wherein the selected rate of change corresponds to at least one of the wheels having a desired frictional engagement with a surface over which the vehicle is moving.

* * * * *